United States Patent
Tonooka

(12) 
(10) Patent No.: US 6,332,265 B1
(45) Date of Patent: Dec. 25, 2001

(54) ROLLING BEARING MANUFACTURING APPARATUS AND METHOD

(75) Inventor: Katsuhisa Tonooka, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/400,184

(22) Filed: Sep. 21, 1999

(30) Foreign Application Priority Data

Sep. 21, 1998 (JP) .................................................. 10-266596

(51) Int. Cl.⁷ .................................................. B21D 53/10
(52) U.S. Cl. ........................... 29/724; 451/52; 29/898.063
(58) Field of Search ............................... 29/898.063, 724, 29/898.062, 898.066, 898.07, 898.09, 28, 33 R, 557; 384/510, 511, 537, 559, 560, 564, 569, 584; 451/49, 50, 52, 262

(56) References Cited

U.S. PATENT DOCUMENTS

| | | | |
|---|---|---|---|
| 2,972,841 | * 2/1961 | Anderson | 451/52 |
| 3,005,297 | * 10/1961 | Spicacci | 451/52 |
| 3,077,061 | * 2/1963 | St. John | 451/52 |
| 3,571,879 | * 3/1971 | Kleinhenz | 29/198.4 |
| 3,714,694 | * 2/1973 | Dobson | 29/148.4 R |
| 4,193,227 | * 3/1980 | Uhtenwoldt | 451/52 |
| 4,435,890 | * 3/1984 | Ernst et al. | 29/898.066 |
| 4,567,695 | * 2/1986 | Schaeffler | 451/52 |
| 5,497,559 | * 3/1996 | Okumura et al. | 33/517 |
| 5,557,854 | * 9/1996 | Fujioka | 33/517 |

* cited by examiner

Primary Examiner—S. Thomas Hughes
Assistant Examiner—Marc W. Butler
(74) Attorney, Agent, or Firm—Sughrue Mion, PLLC

(57) ABSTRACT

A rolling bearing manufacturing apparatus is used to work the two races of a rolling bearing and then assemble the thus worked outer and inner races together with a plurality of rolling elements into the rolling bearing. The present apparatus comprises an outer race groove working machine 11 for working the outer race of the rolling bearing to thereby form a raceway groove therein, a gauge part 23 for measuring the raceway diameter of the raceway groove of the outer race after the present raceway groove is worked by the outer race groove working machine 11, and an inner race grinding machine 12 which, in accordance with the thus measured raceway diameter, works the raceway groove of the inner race in such a manner that an internal clearance can provide a predetermined constant amount.

6 Claims, 7 Drawing Sheets

ROLLING BEARING MANUFACTURING APPARATUS AND METHOD

BACKGROUND OF THE INVENTION

1. Field of the Invention

The present invention relates to a rolling bearing manufacturing apparatus and method and, in particular, to a technology which works a groove in a rolling bearing in order to provide a substantially constant internal clearance after the rolling bearing is assembled, thereby enhancing an efficiency of a rolling bearing assembling operation.

2. Description of the Related Prior Art

In FIG. 5, there is shown a single row ball bearing 1 which is an example of a conventional rolling bearing. The single row ball bearing 1 comprises an outer race 2, an inner race 3, and a plurality of rolling elements (for example, balls) 4. The bearing 1 is assembled in such a manner that a predetermined amount of clearance is provided between the respective raceway grooves 2a, 3a of the outer and inner races 2, 3 and their associated rolling elements 4.

Conventionally, in a grinding process for grinding the above-mentioned raceway grooves of the outer and inner races, there are previously set target dimensions respectively for the raceway diameters with respect to their associated outer race raceway groove and inner race raceway groove and, while controlling the dimensions of the outer and inner race raceway diameters independently of each other, the raceway grooves of the outer and inner races are worked separately. That is, the raceway grooves are ground independently of each other with no mutual relation between the outer and inner races 2 and 3.

That is, when grinding the outer race raceway groove 2a, the quality of the grinding operation is controlled such that the raceway diameter Da of the outer race raceway groove 2a does not deviate from the range between an upper limit value Damax and a lower limit value Damin determined with respect to a standard dimension Dao.

In this case, the raceway diameter Da of the outer race raceway groove 2a varies as shown in FIG. 6(a) as the number of outer races 2 actually manufactured increases. Here, variations in a rising portion shown by an arrow a are variations in the dimension of the outer race raceway diameter caused by the thermal deformation of a grinding wheel, whereas small variations respectively shown by an arrow b are variations in the dimension of the outer race raceway diameter caused by the dressing of the grinding wheel. Also, as shown by an arrow c, if the value of the raceway diameter Da reaches the upper limit value Damax, then dimension feedback is carried out by means of a post-gauging operation or a dimension adjustment is made by an operator, so that the value of the raceway diameter Da is returned to the standard dimension Dao.

On the other hand, when grinding the inner race raceway groove 3a, similarly to the above grinding operation of the outer race raceway groove 2a, the quality of the grinding operation is controlled such that the raceway diameter Db of the inner race raceway groove 3a does not deviate from the range between an upper limit value Dbmax and a lower limit value Dbmin determined with respect to a standard dimension Dbo.

In this case, the raceway diameter Db of the inner race raceway groove 3a varies as shown in FIG. 6(b) with an increase in the number of inner races 3 actually manufactured. However, since the size of a grinding wheel and a mechanical structure employed in the present grinding operation are different from the former grinding operation, the variation pattern of the raceway diameter Db of the inner race raceway groove 3b is considerably different in the variation cycle and the like from the variation pattern of the raceway diameter Da of the outer race raceway groove 2a shown in FIG. 6(a).

After the above grinding operation of the respective raceway grooves, generally, in order to enhance the degree of the roughened surfaces of the groove surfaces, a substantially predetermined amount of minute margin is removed from the groove surfaces by a superfinishing machine. Next, in an assembling step, out of the outer races 2 and inner races 3 which have been manufactured separately, there are extracted an outer race 2 and an inner race 3 at random, the respective raceway diameters of the thus extracted outer and inner races are measured, a plurality of rolling elements 4 each having a proper outside diameter Dc are selected on the basis of the thus measured raceway diameters in such a manner that an internal clearance in the assembled body can be set within a specified range, and the thus selected rolling elements 4 are respectively assembled with the outer race 2 and inner race 3.

As the rolling element 4, there are previously prepared a plurality of rolling elements having two or more ranks of outside diameters such as ±0, ±1 $\mu$m, ±2 $\mu$m, ±3 $\mu$m, and ±4 $\mu$m in nominal dimensions, and a plurality of rolling elements each having a proper rank of outside diameter are selected out of the prepared rolling elements.

For example, when a raceway diameter difference between the outer race raceway groove 2a and the inner race raceway groove 3a is larger by 2 $\mu$m than the standard dimension (that is, the difference is +±2 $\mu$m with respect to the standard dimension), there is selected a rolling element 4 having an outside dimension Dc which is smaller by 1 $\mu$m than the standard dimension (that is, −1 $\mu$m with respect to the standard dimension).

On the other hand, when the raceway diameter difference between the outer race raceway groove 2a and the inner race raceway groove 3a is −8 $\mu$m with respect to the standard dimension, there is selected a rolling element 4 having an outside dimension Dc which is +4 $\mu$m with respect to the standard dimension.

By the way, when there have been collected 10,000 pieces of data on the deviation amounts of the raceway diameters Da of the outer race raceway grooves 2a from the standard dimension Dao as well as on the deviation amounts of the raceway diameters Db of the outer race raceway grooves 3a from the standard dimension Dbo, it has been found that they are distributed in such a manner as shown by a histogram in FIG. 7. That is, according to FIG. 7, the raceway diameter of the outer race 2 has a peak at a value of approx. +17 $\mu$m, whereas the raceway diameter of the inner race 3 has a peak at a value of approx. +2 $\mu$m. In other words, the outside diameters of the rolling elements are set such that, when the outside diameters provide such peak dimensions, there can be formed an ideal clearance (that is, a clearance dimension regarded as a standard dimension).

If it is assumed that the actual dimension of the clearance is expressed as hr and the standard dimension of the clearance is expressed as hro, then the relation between the raceway diameters of the respective outer and inner races, rolling element outside diameters and clearance dimensions can be expressed by the following equation: that is, $$(hr-Hro)=(Da-Dao)-(Db-Dbo)-2(Dc-Dco),$$

where Dco expresses a rolling element outside diameter dimension regarded as a standard dimension.

Now, assuming that a standard clearance dimension hro is 15±1 μm and the adjusted dimensions of prepared rolling element outside diameters are ±0 μm, ±1 μm, ±2 μm, ±3 μm, and ±4 μm, that is, 9 ranks, for example, when the raceway diameter dimension difference of the outer races 2 is +17 μm and the raceway diameter dimension difference of the inner races 3 is +2 μm, if there is selected a rolling element 4 having an adjusted dimension of 0 μm, then a clearance dimension can be set as +15 μm which falls under the dimension range of the standard clearance.

However, during actual manufacture, there can occur a case where an outer race 2, in which the raceway diameter Da of the outer race raceway groove 2a is deviated greatly toward the + side with respect to the standard diameter Dao, and an inner race 2, in which the raceway diameter Db of the outer race raceway groove 3a is deviated greatly toward the − side with respect to the standard diameter Dbo, are combined together. For example, when the raceway diameter dimension difference of the outer race 2 is +24 μm and the raceway diameter dimension difference of inner outer race 3 is −6 μm, even if there is selected a rolling element 4 having the largest rank of outside diameter, that is, +4 μm, the clearance dimension becomes 24−(−6)−2×4=22 μm, which does not fall under the standard clearance dimension range (15±1 μm).

Therefore, in order to make the clearance dimension fall under the allowable range, it is necessary to prepare separately a rolling element 4 whose deviation amount with respect to the standard dimension is −7 or −8 μm, or it is necessary to change the combination of the currently selected outer race 2 and inner race 3.

However, in the former case, it is necessary to expand the range of classification of the outside diameters Dc of the rolling elements. This not only takes time and labor to manufacture the rolling elements as well as measure and classify the outside diameter dimensions thereof, but also complicates an operation to select proper rolling elements before assembling the rolling elements together with outer and inner races.

Also, in the latter case, one of the inner and outer races once combined together must be replaced a new one, with the result that an operation to assemble the outer and inner races is inevitably made troublesome.

That is, in the above-mentioned conventional rolling bearing manufacturing method or apparatus, since the outer and inner races separately manufactured are combined together at random, it is difficult that the inner and outer races, which vary in dimension in a time series manner, are combined with the rolling elements with high precision.

SUMMARY OF THE INVENTION

The present invention aims at eliminating the drawbacks found in the above-mentioned conventional rolling bearing manufacturing apparatus. Accordingly, it is an object of the invention to provide a rolling bearing manufacturing apparatus and method which can enhance the rate of fit of the rolling elements between the outer and inner races of the rolling bearing, thereby enhancing the efficiency of the rolling bearing manufacturing process.

In attaining the above object, according to the invention, there is provided a rolling bearing manufacturing apparatus for working an outer race and an inner race for a rolling bearing and then assembling the thus worked outer and inner races together with a plurality of rolling elements into the rolling bearing, the apparatus comprising a first raceway groove working member, a raceway diameter measuring member, and a second raceway groove working member.

The first raceway groove working member works one of the outer and inner races of the rolling bearing to thereby form a first raceway groove therein. The raceway diameter measuring means, after the above raceway groove is worked by the first raceway groove working means, measures the raceway diameter of the thus worked one race. The second raceway groove working member, in accordance with the thus measured raceway diameter, works the other race of the rolling bearing to thereby form a second raceway groove therein.

According to the present rolling bearing manufacturing apparatus or method, after the raceway groove of one of the races of the rolling bearing is worked by the first raceway groove working means, the raceway diameter of the thus worked raceway groove is measured by the raceway diameter measuring means and, in accordance with the thus measured raceway diameter of the above-mentioned one race, the raceway groove of the other race of the rolling bearing is worked by the second raceway groove working means. Thanks to this structure, the diameter-direction clearance between the raceway groove surface of the outer race and the raceway groove surface of the inner race after assembled can be kept substantially constant. Therefore, the kinds of rolling elements, which are to be respectively mounted between their associated outer and inner races and are classified by the outside diameter dimensions thereof, can be reduced, which in turn makes it possible not only to simplify the rolling element classification preparing operation and as well as the rolling element selecting operation when assembling the rolling bearing, but also to enhance the fit rate of the rolling element between the outer and inner races. This can improve the efficiency of the rolling bearing manufacturing to a great extent.

Also, preferably, there may be provided assembling means which extracts selectively the outer and inner races worked synchronously by the first and second raceway groove working means and then assembles them together. In other words, in the above-mentioned rolling bearing manufacturing apparatus, it is preferable to further comprises an assembling member for assembling one of a plurality of races which are worked by the first raceway groove working member and one of a plurality of races which are worked by the second raceway groove working member.

Thanks to this, by storing the worked outer and inner races once while setting a relationship between the mutually corresponding races, that is, while setting the correspondence between the outer and inner races worked synchronously, it is possible to assemble together the associated outer and inner races later at a proper time without assembling them just after the grooves thereof are worked, thereby being able to enhance the operation efficiency of the rolling bearing manufacturing process.

Further, preferably, the raceway groove of the other race of the rolling bearing may be worked after setting a work target value in accordance with the mean value of a predetermined number of one race raceway diameters and the mean value of a predetermined number of the other race raceway diameters. That is, it is preferable that the second raceway groove working member works the other of the races on the basis of a predetermined work target value which is determined in accordance with at least one of a mean value of a predetermined number of raceway diameters of the races having the first raceway grooves and a mean value of a predetermined number of raceway diameters of the races having the second raceway grooves.

Due to this, the work target value can be set up without being influenced by a small variation in the dimension of each individual race, which makes it possible to work the raceway grooves in such a manner that the variations in the raceway diameters can be reduced stably.

And, according to the invention, there can also be provided a rolling bearing manufacturing method comprising the steps of:

working one of an outer race and an inner race of a rolling bearing, to thereby form a first raceway groove therein;

measuring the raceway diameter of the thus worked raceway groove;

setting a work target value for the raceway groove of the other of the outer and inner races in accordance with the thus measured raceway diameter of one race;

working the other of the races in accordance with the thus set work target value, to thereby form a second raceway groove therein.

In the above-mentioned rolling bearing manufacturing method, it is preferable to further comprises the steps of:

assembling one of a plurality of races which are thus worked by the first raceway groove working step and one of a plurality of races which are thus worked by the second raceway groove working steps.

According to the present rolling bearing manufacturing method, since the raceway groove of the other race is worked in accordance with the raceway diameter of one race, the diameter-direction clearance between the two mating races can be kept substantially constant. Therefore, according to the invention, there can be provided a rolling bearing manufacturing method which not only can simplify the manufacturing operation and classifying operation of the rolling elements to be mounted between the two races as well as the rolling element selecting operation when assembling together the two races and their associated rolling elements into the rolling bearing, but also can enhance the fit rate of the rolling elements between the two races.

DETAILED DESCRIPTION OF THE PREFERRED EMBODIMENTS

Now, description will be given below of an embodiment of a rolling bearing manufacturing method according to the invention with reference to FIGS. 1 to 5.

Figure 1:
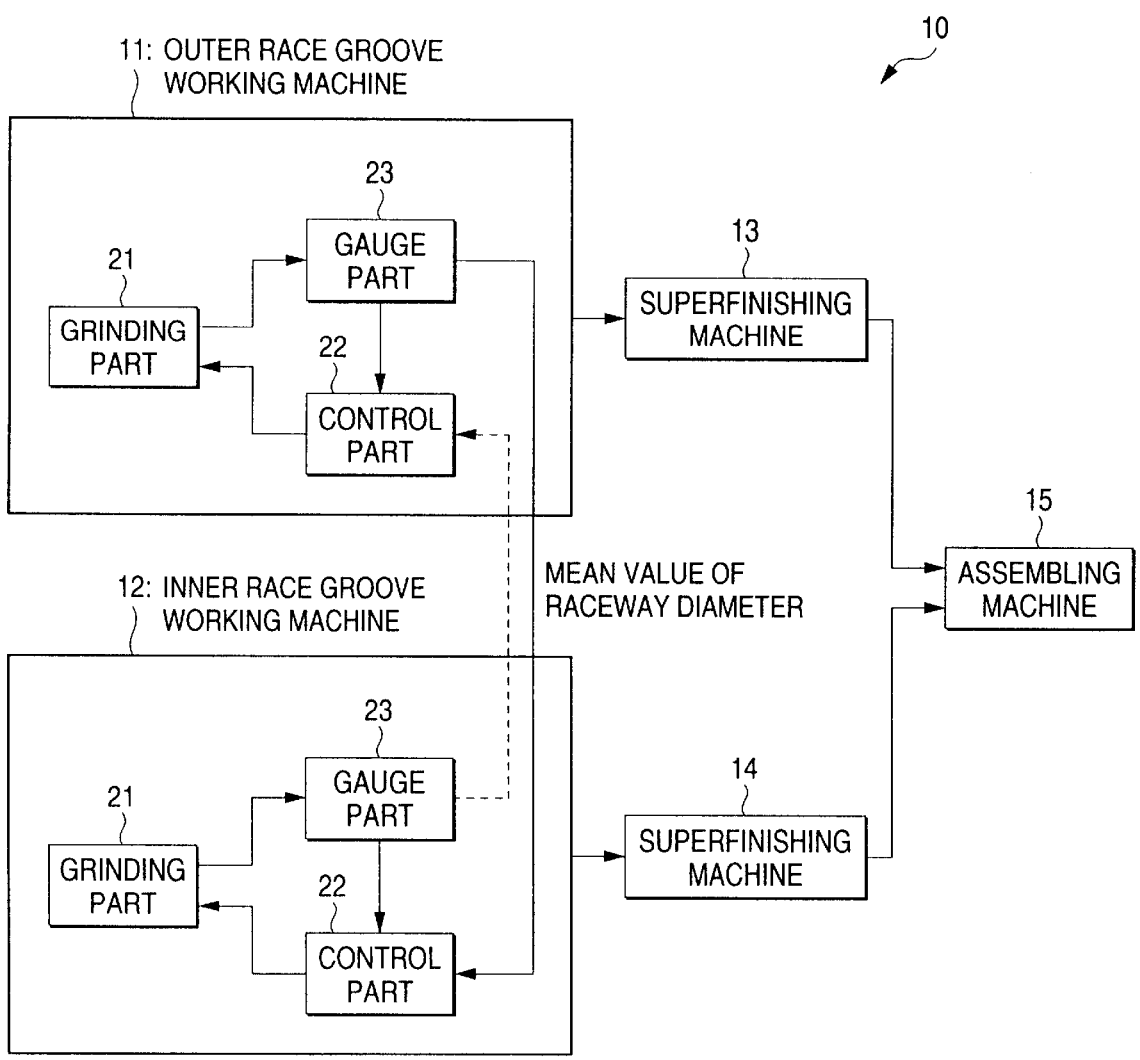
FIG. 1 is a block diagram of the respective functional parts of an embodiment of a rolling bearing manufacturing apparatus according to the invention.
Figure 2:
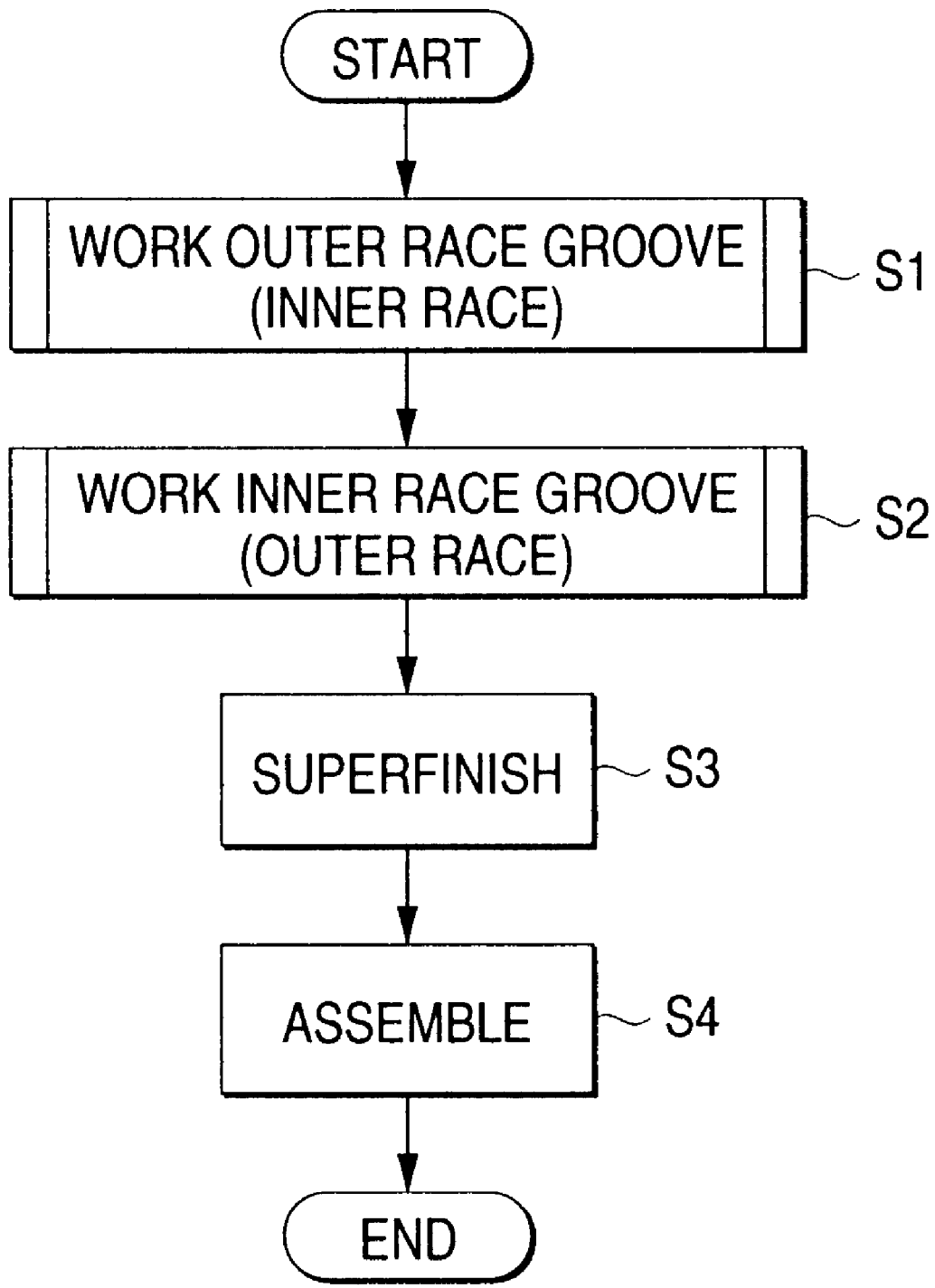
FIG. 2 is a flow chart of a basic manufacturing procedure for manufacturing a rolling bearing according to the embodiment of the invention.
Figure 3:
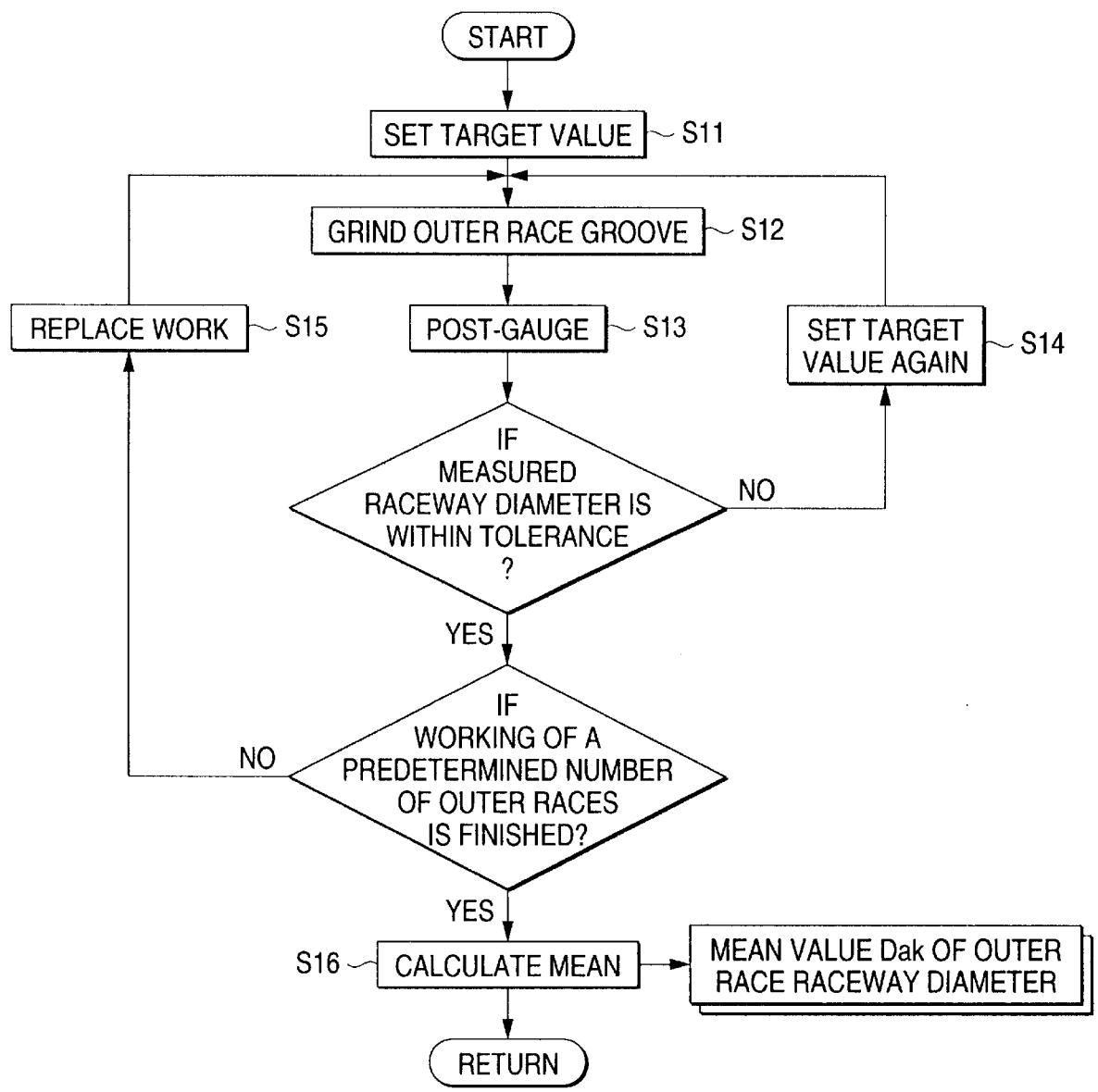
FIG. 3 is a flowchart of the detailed processing contents of an outer race groove working procedure shown in FIG. 2.
Figure 4:
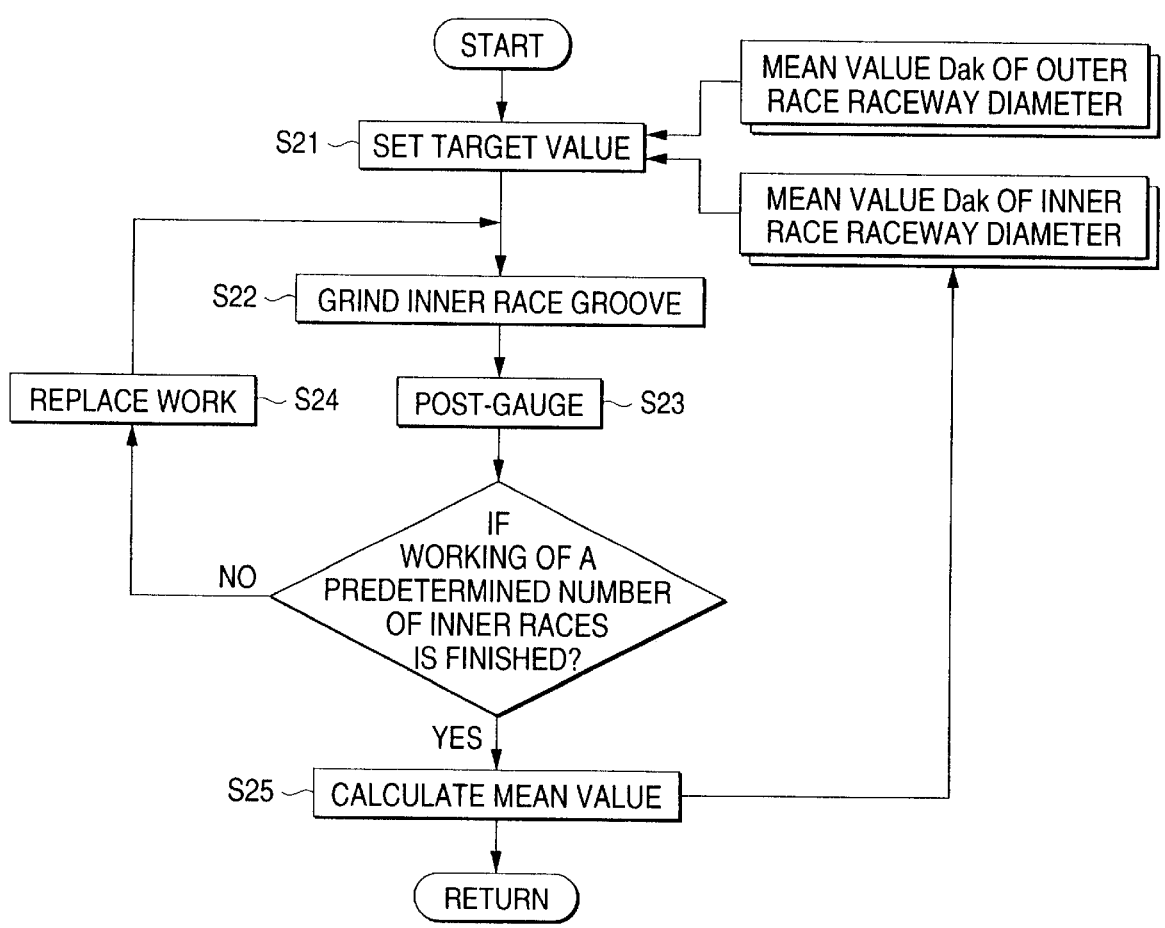
FIG. 4 is a flowchart of the detailed processing contents of an inner race groove working procedure shown in FIG. 2.

Here, FIG. 1 is a block diagram of the respective functional parts of a rolling bearing manufacturing apparatus according to an embodiment of the invention; FIGS. 2 to 4 are respectively flow charts of a procedure for manufacturing a rolling bearing according to the invention; and, FIG. 5 is a section view of an example of the structure of a ball bearing of a single row type.

At first, description will be given below of an embodiment of a rolling bearing according to the invention.

Figure 5:
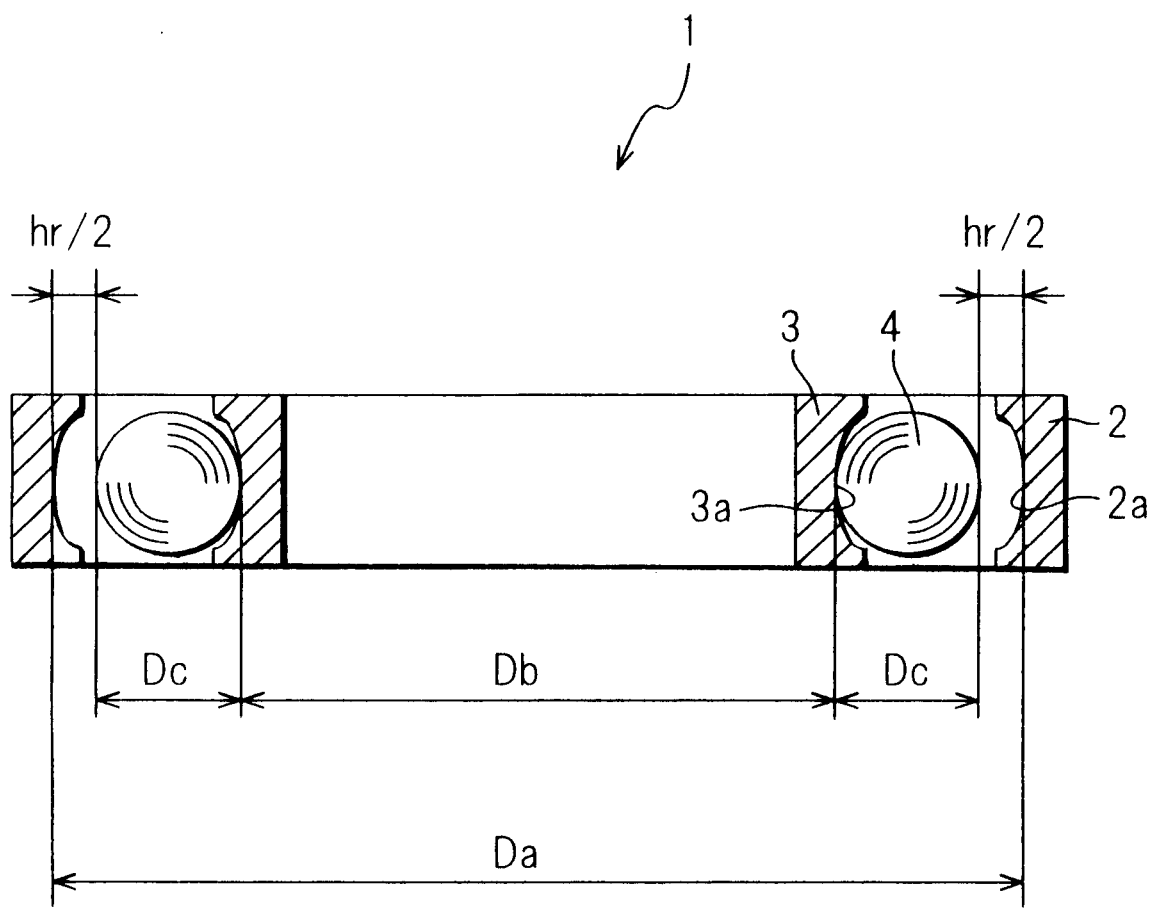
FIG. 5 is a section view of the structure of a single row ball bearing.
Figure 6:
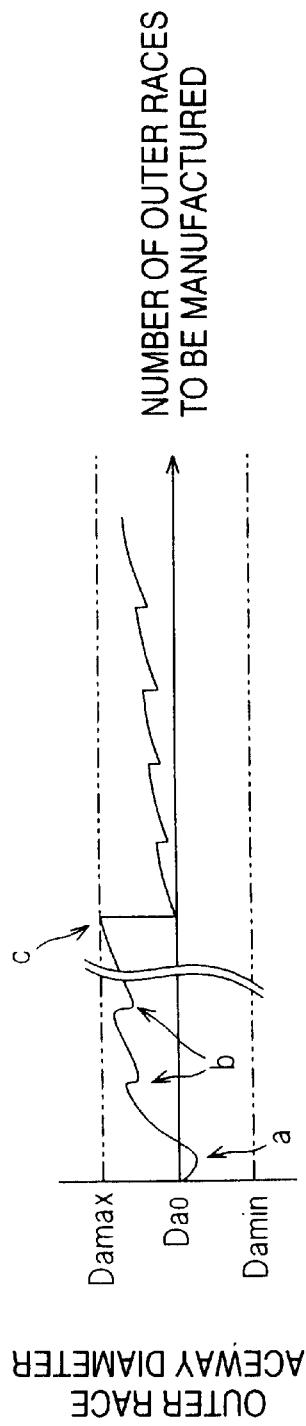
FIGS. 6(a) and 6(b) are graphical representations of the variations in the raceway diameter dimensions of an outer race raceway groove and an inner race raceway groove; and, FIGS. 7(a) and 7(b) are histograms of the distributions of the deviation amounts of the respective raceway diameters of an outer race raceway groove and an inner race raceway groove from their respective standard dimensions.
Figure 6:
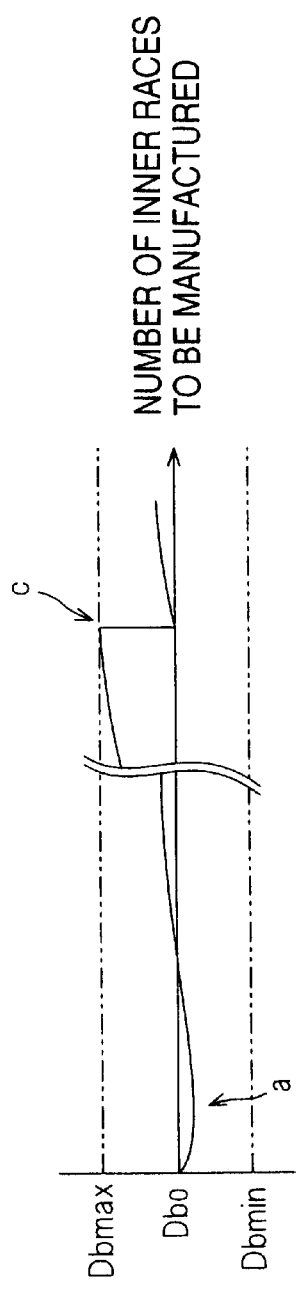
Figure 7:
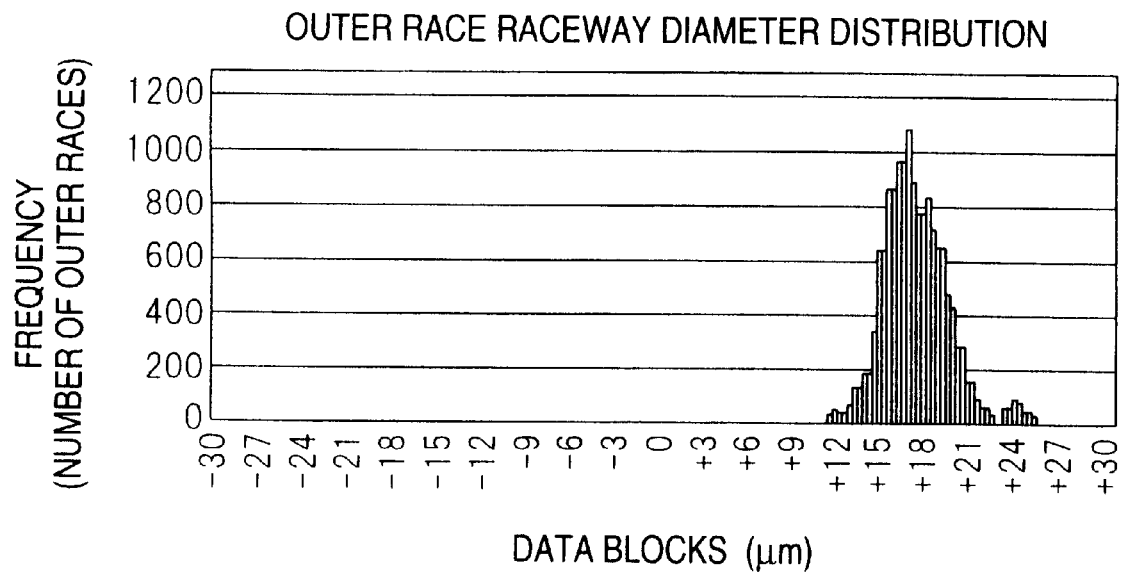
Figure 7:
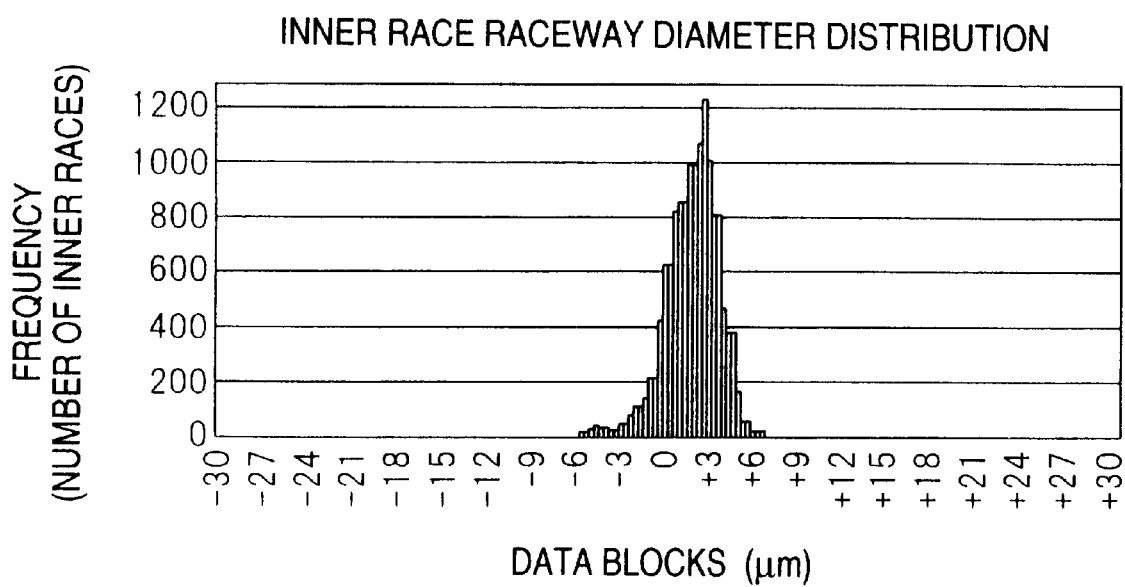

A rolling bearing manufacturing apparatus 10 shown in FIG. 1 comprises an outer race groove working machine 11 serving as first raceway groove working means for grinding the raceway groove 2a of the outer race 2 of the rolling bearing shown in FIG. 5, an inner race grinding machine 12 serving as second raceway groove working means for grinding the raceway groove 3a of the inner race 3 of the rolling bearing shown in FIG. 5, two superfinishing machines 13, 14 respectively for superfinishing the outer race 2 and inner race 3 after their associated raceway grooves 2a and 3a are ground, and an assembling machine 15 serving as assembling means for assembling together the outer race 2 and inner race 3.

Also, the outer race grinding machine 11 and inner race grinding machine 12 each include a grinding part 21 for grinding a work (outer race, or inner race) using a grinding wheel, a control part 22 for setting up various grinding conditions such as the feeding of the grinding wheel, the cutting by the grinding wheel and the like to thereby control the grinding part 21, and a gauge part 23 for post-gauging the ground work to thereby measure the raceway diameter of the ground work. As a measuring method used by the gauge part 23, there can be used any one of well-known measuring methods, provided it is arranged in such a manner as to be able to avoid error factors caused by variations in the noise and work temperatures depending on measuring types as much as possible.

Next, description will be given below in detail of the contents of the respective steps of a roller bearing manufacturing procedure to be carried out by the above-structured rolling bearing manufacturing apparatus 10, including the grinding step of grinding the respective outer and inner races, the superfinishing step of superfinishing the ground outer and inner races, and the assembling step of assembling together the superfinished outer and inner races, with reference to the flow charts respectively shown in FIGS. 2 to 4. In the present embodiment, as shown in FIG. 2, in Step 1 (which is hereinafter referred to as S1), the outer race 2 is worked to thereby form a raceway groove 2a therein; and, in S2, the inner race 3 is worked to thereby form a raceway groove 3a therein (of course, S1 and S2 may be carried out simultaneously, or the order thereof may be reversed). After then, in S3, the thus worked outer race 2 and inner race 3 are respectively superfinished. This superfinishing operation removes a portion of a predetermined dimension from each of the outer and inner races to thereby control the surface roughness thereof to a minimum level. The outer race 2 and inner race 3, whose variations in the dimensions have been adjusted down to a minimum, are then assembled together with a plurality of rolling elements 4 in the next step, that is, in S3. By carrying out the above-mentioned steps simultaneously in an assembly line, there can be obtained rolling bearing assemblies successively.

Next, description will be given below in detail of the operation to work or grind the raceway groove of the outer race 2 with reference to a flow chart shown in FIG. 3. As shown in FIG. 3, in the outer race 2 raceway groove grinding operation, at first, the control part 22 of the outer race groove working machine 11 sets a work target value to be ground (S11), and the grinding part 21 grinds the raceway groove 2a of the outer race 2 (S12). After the raceway groove 2a is ground, the outer race 2 is post-gauged by the gauge part 23 to measure the raceway diameter Da of the outer race 2 (S13). And, it is checked whether the measured raceway diameter Da is present within a predetermined tolerance (that is, between the minimum diameter Damin and the maximum diameter Damax), and, if it is found that the measured raceway diameter Da is outside of the predetermined tolerance, then there is carried out a feedback control for setting the work target value again (S14). Specifically, the feedback control is carried out in the following manner: that is, when the actually measured raceway diameter Da is larger than the maximum diameter Damax, ΔDa (=Damax−Dao) is added to the work target value; and, when the actually measured raceway diameter Da is smaller than the minimum diameter Damin, ΔDa (=Dao−Damin) is added to the work target value.

In accordance with the thus corrected work target value, the next grinding operation is executed. Here, Dao is a median between Damin and Damax and is used as a standard dimension for the raceway diameter. This feedback control may be carried out for each work, or for each group of works.

On the other hand, if the raceway diameter Da is found within the predetermined tolerance, then the working operation is ended and the current work is replaced by a new work (S15); and, the work target value remains set as it is and, similarly to the above operation, the next work is worked or ground to thereby form a raceway groove therein. After a predetermined number of outer races have been worked, a predetermined number of outer race raceway diameters Da obtained by the post-gauging operations are collected together to thereby calculate the mean value Dak of the raceway diameters (S16). To calculate the mean value Dak, for example, there can be used an arithmetic mean method.

Next, description will be given below in detail of the operation to work or grind the raceway groove of the inner race 3 with reference to a flow chart shown in FIG. 4. As shown in FIG. 4, in the inner race 3 raceway groove working operation, at first, the control part 22 of the inner race groove working machine 12 sets the work target value to be ground (S21). The target value is set up in accordance with the mean value Dak of the outer race raceway diameters obtained in the outer race groove working operation and the mean value Dbk of an inner race raceway diameter to be discussed later; and, specifically, the target value is set up by adding ΔDb shown in the following equation to a standard value "which is an ideal value of the raceway diameter Db of the inner race raceway groove 3a".

$$\Delta Db = (Dbk - Dbo) + (Dak - Dao)$$

where Dbo, similarly to the aforementioned Dao, is the median of the tolerance, that is, it is a median between Dbmin and Dbmax and is used as a standard dimension for the raceway diameter. By the way, the mean value Dbk of the inner race raceway diameters obtained in the first working operation is not decided until a predetermined number of inner races are worked. However, in this period, for example, the mean value Dbk may be previously set in a virtual manner, or the raceway diameter of the inner race being currently worked may be used as the mean value Dbk.

Also, the above mean value is not limited to the mean value of the raceway diameters but it may be other parameter which shows the state of the raceway groove dimension.

Next, the raceway groove 3a of the inner race 3 is worked or ground by the grinding part 21 of the inner race groove working machine 12 (S22). After completion of this grinding operation, the inner race 3 is post-gauged by the gauge part 23 to thereby measure the raceway diameter Db of the inner race 3 (S23). After then, the current work is replaced with a new work (S24) and the new work is worked by grinding; this grinding operation is repeated until a predetermined number of inner races 3 are worked. After the predetermined number of inner races 3 are worked, a predetermined number of inner race raceway diameters Db respectively obtained by the post-gauging operations are collected together to thereby calculate the mean value Dbk of the raceway diameters (S25). The thus calculated mean value Dbk of the raceway diameters is used in the work target value setting operation to be carried out in the above-mentioned step S1.

As has been described heretofore, the rolling bearing manufacturing apparatus according to the invention provides the following characteristics. That is, as shown in FIG. 5, between the raceway diameter Da of the outer race 2, the raceway diameter Db of the inner race 3, the outside diameter Dc of the rolling element, and the clearance hr, there can be found the relation expressed in the following equation:

$$hr = (Da - Db) - 2Dc$$

Conventionally, in order to keep the clearance hr constant, the variation in the raceway diameters of the outer race 2 and inner race 3 (Da−Db) is adjusted by changing the outside diameter DC of the rolling element 4. On the other hand, according to the invention, the variation in the raceway diameter Da of the outer race which is one of the two races is controlled by adjusting the raceway diameter Db of the inner race, which is the other race serving as a partner race to be combined with, so that the clearance hr after assembled can be kept constant. In other words, the inner race raceway groove is worked synchronously with the working of the outer race raceway groove in such a manner that the variation in the raceway diameter of the outer race occurring in the outer race groove working operation can be absorbed directly on the inner race side, and a set of outer race 2 and inner race 3 thus worked synchronously are assembled together with their associated rolling elements, whereby a predetermined amount of clearance can be kept constant. Thanks to this, a rolling bearing improved in the fit rate of the rolling elements between the outer and inner races can be manufactured easily.

Also, due to the above, the kinds of rolling elements, which are differ in the outside diameter dimension from one another and are to be previously prepared when assembling a rolling bearing, can be reduced to a great extent, thereby being able to simplify the rolling bearing assembling operation. Especially, when a rolling element to be fitted is formed of ceramics material, the rolling element itself is expensive because the ceramics material itself is not only expensive but also difficult to work. That is, in this respect, it can well be said that the effect of the invention is more outstanding.

By the way, in the above-mentioned embodiment, the raceway diameter of the inner race 3 is adjusted in accordance with the raceway diameter of the outer race 2. However, this is not limitative but, of course, there can also be employed a structure in which the raceway diameter of the outer race 2 is adjusted in accordance with the raceway diameter of the inner race 3. In this case as well, there can be provided a similar effect.

Also, the works (the respective races) that have been worked by the outer race groove working machine 11, inner race groove working machine 12, and superfinishing machines 13, 14 may be stored once while defining the correspondence between the outer and inner races and, after then, the works may be assembled together by the assembling machine 15. This correspondence may be controlled by grouping the outer and inner races in which variations in the raceway diameters of the races used as the foundation of the work target value are small; for example, the outer and inner races may be grouped according to intervals between the dressing operations of the grinding wheel. Thanks to this, each individual working step can be enforced with high efficiency and thus the whole of the manufacturing process can be streamlined, thereby being able to reduce the manufacturing cost.

The present invention is based on Japanese Patent Application No. Hei. 10-266596, which is incorporated herein by reference.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

According to the invention, the raceway groove of one of outer and inner races is worked and, in accordance with the raceway diameter dimension that is measured after the present raceway groove is worked, the raceway groove of the other race is then worked. Thanks to this, the diameter-direction dimensions of the raceway groove surfaces of the two outer and inner races can be kept constant in a simple manner; the kinds of rolling elements, which are respectively mounted between their associated outer and inner races and are classified by the outside diameter dimensions thereof, can be decreased, which in turn makes it possible not only to simplify the rolling element manufacturing operation and classifying operation as well as the rolling element selecting operation when assembling a rolling bearing, but also to enhance the fit rate of the rolling elements between the outer and inner races. This can save labor in the rolling bearing manufacturing process and reduce the rate of defective products, which makes it possible to improve the efficiency of the rolling bearing manufacturing operation to a great extent.

What is claimed is:

1. A rolling bearing manufacturing apparatus for working an outer race and an inner race of a rolling bearing, comprising:

first raceway groove working member for working one of said outer and inner races to thereby form a first raceway groove therein;

raceway diameter measuring member for measuring a raceway diameter of said one of said races after said raceway groove is worked by said first raceway groove working member on said one of said races; and second raceway groove working member for working the other of said races in accordance with said measured raceway diameter, to thereby form a second raceway groove therein.

2. The rolling bearing manufacturing apparatus according to claim 1, wherein said second raceway groove working member works the other of said races based on a predetermined work target value which is determined in accordance with a mean value of a predetermined number of raceway diameters of a plurality of said one of said races having said first raceway grooves.

3. The rolling bearing manufacturing apparatus according to claim 1, wherein said second raceway groove working member works the other of said races based on a predetermined work target value, and the rolling bearing manufacturing apparatus further comprises a feedback control member for adjusting said predetermined work target value in accordance with information regarding a difference between said predetermined work target value and an actually measured raceway diameter of said one of said races having said first raceway groove.

4. The rolling bearing manufacturing apparatus according to claim 1, wherein said second raceway groove working member works the other of said races based on a predetermined work target value which is determined in accordance with a mean value of a predetermined number of raceway diameters of a plurality of said one of said races having said first raceway grooves and a mean value of a predetermined number of raceway diameters of a plurality of the other of said races having said second raceway grooves.

5. The rolling bearing manufacturing apparatus according to claim 1, wherein said one of races having said first raceway groove is an outer race, and said other of races having said second raceway groove is an inner race.

6. The rolling bearing manufacturing apparatus according to claim 1, further comprising:

an assembling member for assembling one of a plurality of races which are worked by said first raceway groove working member and one of a plurality of races which are worked by said second raceway groove working member.

\* \* \* \* \*